(12) United States Patent
Geuecke et al.

(10) Patent No.: US 10,556,250 B2
(45) Date of Patent: Feb. 11, 2020

(54) WATER-REPELLENT COATING APPLYING SYSTEM

(71) Applicant: Ford Global Technologies, LLC, Dearborn, MI (US)

(72) Inventors: Theo Geuecke, Attendorn (DE); Abidine Ould-Merzough, Aachen (DE); Clemens Maria Verpoort, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/463,386

(22) Filed: Mar. 20, 2017

(65) Prior Publication Data
US 2017/0312779 A1 Nov. 2, 2017

(30) Foreign Application Priority Data
Apr. 29, 2016 (DE) .................. 10 2016 207 365

(51) Int. Cl.
*B05D 1/28* (2006.01)
*B60S 1/48* (2006.01)
(Continued)

(52) U.S. Cl.
CPC .................. *B05D 1/28* (2013.01); *B60S 1/48* (2013.01); *B60S 1/485* (2013.01); *B60S 1/50* (2013.01);
(Continued)

(58) Field of Classification Search
CPC .... B60S 1/46; B60S 1/48; B60S 1/522; B60S 1/524; B60S 1/526; B60S 1/50;
(Continued)

(56) References Cited

U.S. PATENT DOCUMENTS 2,173,021 A * 9/1939 Longwell .................. B60S 1/48
15/250.04
3,014,814 A * 12/1961 McConica ................ B60S 1/48
118/315
(Continued)

FOREIGN PATENT DOCUMENTS

JP 8-80816 * 3/1996
KR 20-2010-0006687 * 7/2010

OTHER PUBLICATIONS

Brooks, G., "Analysis: Mercedes' Magic Vision," published on Just-Auto website http://www.just-auto.com, Dec. 15, 2011; downloaded May 25, 2012; 3 pages. (Year: 2011).*
(Continued)

*Primary Examiner* — Gary K. Graham
(74) *Attorney, Agent, or Firm* — Vichit Chea; Carlson, Gaskey & Olds, P.C.

(57) ABSTRACT

An exemplary system for applying a water-repellent coating to the outside of a window of a vehicle includes at least one reservoir for a hydrophobic fluid, at least one wiper with a wiper blade, and a control device. A first line leads from the reservoir to the wiper. The first line extends at least over part of the length of the wiper and has, in the region of the wiper blade, at least one opening by way of which the hydrophobic fluid can be applied to the window. An exemplary method for applying a water-repellent coating to a window of a vehicle, includes, among other things, determining a status of the water-repellent properties of the window with reference to a threshold value of a quantity of water on the outer-facing surface of the window, transmitting a signal from the control device to initiate a communicating of a hydrophobic fluid from a reservoir to a wiper when the status indicates that the quantity of water on the window has reached the threshold value, communicating hydrophobic
(Continued)

fluid from the reservoir to the wiper, distributing hydrophobic fluid on the window by means of a movement of the wiper.

18 Claims, 3 Drawing Sheets

(51) Int. Cl.
| | |
|---|---|
| *B60S 5/00* | (2006.01) |
| *B60S 1/50* | (2006.01) |
| *B60S 1/52* | (2006.01) |
| *B05D 5/08* | (2006.01) |
| *B05D 1/42* | (2006.01) |
| *B60S 1/02* | (2006.01) |

(52) U.S. Cl.
CPC ............... *B60S 1/524* (2013.01); *B60S 5/00* (2013.01); *B05D 1/42* (2013.01); *B05D 5/08* (2013.01); *B05D 2203/35* (2013.01); *B60S 1/02* (2013.01); *C03C 2217/76* (2013.01)

(58) Field of Classification Search
CPC ... B60S 1/485; B60S 1/02; B60S 5/00; B05D 1/28; B05D 1/42; B05D 5/08; B05D 2203/35; C03C 1/02; C03C 2217/76
USPC .......... 15/250.04, 250.02, 250.01; 239/284.1
See application file for complete search history.

(56) References Cited

U.S. PATENT DOCUMENTS

| | | | | | |
|---|---|---|---|---|---|
| 3,149,361 | A | * | 9/1964 | Ziegler | B60S 1/34 15/250.04 |
| 3,418,676 | A | * | 12/1968 | Byczkowski | B60S 1/3415 15/250.04 |
| 3,594,846 | A | * | 7/1971 | Kimura | B60S 1/482 15/250.02 |
| 3,854,161 | A | * | 12/1974 | Benson | B60S 1/524 15/250.04 |
| 3,916,473 | A | * | 11/1975 | Williams | B60S 1/524 15/250.04 |
| 4,309,789 | A | * | 1/1982 | Ziner | B60S 1/38 15/250.38 |
| 4,331,295 | A | * | 5/1982 | Warihashi | B05B 1/10 239/284.1 |
| 5,140,234 | A | * | 8/1992 | Wallrafen | B60S 1/0818 15/250.13 |
| 5,327,613 | A | * | 7/1994 | Ohtsu | B60S 1/3411 15/250.01 |
| 5,946,763 | A | * | 9/1999 | Egner-Walter | B60H 3/0658 15/250.02 |
| 5,990,647 | A | * | 11/1999 | Zettler | B60S 1/0822 15/250.1 |
| 6,287,642 | B1 | * | 9/2001 | Leutsch | C23C 14/027 204/192.12 |
| 6,461,537 | B1 | * | 10/2002 | Turcotte | C03C 17/28 106/13 |
| 6,809,072 | B2 | * | 10/2004 | Abidh | C09K 3/18 510/163 |
| 8,366,021 | B2 | * | 2/2013 | Trager | B60S 1/50 239/284.1 |
| 9,387,831 | B2 | * | 7/2016 | Hartman | B60S 1/381 |
| 2007/0044259 | A1 | * | 3/2007 | White, Jr. | A47L 1/02 15/103 |
| 2008/0040880 | A1 | | 2/2008 | Hiruma et al. | |
| 2008/0083081 | A1 | * | 4/2008 | Rhodes | B60S 1/3415 15/250.02 |
| 2009/0212130 | A1 | * | 8/2009 | Franklin, Jr. | B60S 1/485 239/284.1 |
| 2011/0047738 | A1 | * | 3/2011 | Gross | B60S 1/3801 15/250.04 |
| 2013/0045332 | A1 | | 2/2013 | Fang et al. | |
| 2015/0113753 | A1 | * | 4/2015 | Barnwell-Williams | B60S 1/524 15/250.04 |

OTHER PUBLICATIONS

Mercedes-Benz. "Magic Vision Control Adaptive Windscreen Washing System: Visibility As If by Magic," Press Information dated Mar. 2012; 3 pages. (Year: 2012).*
Corrigan, K., "Magic Vision Control from Mercedes-Benz: Clearly a Great Idea!," published on Auto123 website http://auto123.com, Apr. 4, 2012; downloaded May 25, 2012; 3 pages. (Year: 2012).*
Olivia, "'Magic Vision Control' in the SL Roadster," published on Autovisuals website http://autovisuals.com, Jan. 13, 2012; downloaded May 25, 2012, 9 pages. (Year: 2012).*
Machine translation of description portion of Japanese publication 8-80816, published Mar. 1996. (Year: 1996).*
Machine translation of description portion of Korean publication 20-2010-0006687, published 2010 (Year: 2010).*

* cited by examiner

WATER-REPELLENT COATING APPLYING SYSTEM

This application claims priority to DE Patent Application No. 102016207365.6, which was filed on 29 Apr. 2016, the entire contents of which are expressly incorporated herein by reference.

TECHNICAL FIELD

The disclosure relates to a system for applying a water-repellent coating to the surface of a window of a vehicle by means of at least one wiper.

BACKGROUND

Water-repellent coatings are frequently applied to the windows of vehicles, in particular to the windshields, to improve visibility under wet conditions, e.g., in the event of rain or snow. The hydrophobic properties of water-repellent compounds involve a high wetting angle causing droplets distributed on the window to run together to form large round drops which have a low adhesion to the windows. These drops can be easily removed from the window by the action of a wiper. At higher speeds, a wiper is not even necessary since the drops are removed from the window by the action of the airstream.

The water-repellent coatings are generated by the application of a water-repellent fluid. Various application options exist, e.g., applying the fluids by means of a cotton cloth, that is to say distributing the fluid manually on the window, or spraying it on. However, to this end, the window has to be coated manually each time when the water-repellent effect diminishes. This is very laborious. Further options exist for the application of hydrophobic fluid or hydrophobic particles to the window and the distribution thereof by means of the wiper. To this end, for example, hydrophobic particles can be distributed in the material of the wiper, these being applied to, and distributed on, the window continuously upon a movement of the wiper. (For example, see US2008/0040880A1 and US2013/0045332A1). However, to this end, the material of the wiper has to likewise be refilled regularly. A hydrophobic material is moreover applied continuously irrespective of requirement. The object, therefore, is to coat the windows mechanically in a controlled manner when required.

SUMMARY

A system for applying a hydrophobic coating to the outside of a window of a vehicle, according to an exemplary aspect of the present disclosure includes, among other things, at least one reservoir for a water-repellent fluid, at least one wiper, and a control device. A first line leads from the reservoir to the wiper. The first line extends at least over part of the length of the wiper and has, in the region of a wiper blade of the wiper, at least one opening by way of which the hydrophobic fluid can be applied to the window.

In a further non-limiting embodiment of the foregoing system, the wiper arm of the wiper has a hollow profile configured to receive the first line, and configured to communicate the hydrophobic fluid to a wiper blade of the wiper. The hollow profile can be designed in the shape of a tube.

In a further non-limiting embodiment of any of the foregoing systems, the hollow profile is divided into a first tube and a second tube. The first tube is configured to receive the first line. The second tube is configured to receive a second line for communicating water. In an alternative embodiment, however, the tube or tubes can also be designed directly for communicating the corresponding fluid. The corresponding lines lead into the hollow profile.

In a further non-limiting embodiment of any of the foregoing systems, the first tube extends parallel to the second tube.

A further non-limiting embodiment of any of the foregoing systems includes at least one pump that pumps the hydrophobic fluid through the first line from the reservoir to the wiper.

In a further non-limiting embodiment of any of the foregoing systems, the size of the at least one opening in the first line is variably adjustable. In some examples, it is thereby possible to advantageously match the size of the surface to be coated to the quantity of hydrophobic fluid to be applied.

In a further non-limiting embodiment of any of the foregoing systems, a wiper blade of the wiper has a nano-coating. As a result of the nanocoating, it is, in some examples, advantageously possible to adjust the friction between the material of the wiper blade and the hydrophobically coated window.

In a further non-limiting embodiment of any of the foregoing systems, at least one sensor is preferably additionally arranged in the region of the window and operably connected to the control device.

In a further non-limiting embodiment of any of the foregoing systems, the sensor is a rain sensor.

In a further non-limiting embodiment of any of the foregoing systems, a motor vehicle incorporates the system.

A method according to another exemplary aspect of the present disclosure includes, among other things, applying a water-repellent coating to a window of a vehicle by determining a status of the water-repellent properties of the window. The status is identified with reference to a threshold value of a quantity of water on the outer-facing surface of the window. The method transmits a signal from the control device to initiate a communicating of a hydrophobic fluid from a reservoir to a wiper when the status indicates that the quantity of water on the window has reached the threshold value. The method then communicates hydrophobic fluid from the reservoir to the wiper, and distributes hydrophobic fluid on the window by means of a movement of the wiper.

A further non-limiting embodiment of the foregoing method includes repeating the steps of the foregoing method until the quantity of water on the window falls below the threshold value.

A further non-limiting embodiment of any of the foregoing methods includes communicating by pumping the hydrophobic fluid from the reservoir to the wiper.

A further non-limiting embodiment of any of the foregoing methods applies the hydrophobic fluid when the vehicle is not moving. The application of the hydrophobic fluid can be carried out when the vehicle is stationary to ensure the safety of the vehicle occupants and road users, since visibility through the window is restricted during the application.

A further non-limiting embodiment of any of the foregoing methods communicates the identified status to the operator of the vehicle. The control device, in response to a command from the operator, inputs a signal to a pump to transport hydrophobic fluid to the wiper when the quantity of water on the window has reached the threshold value. The status and be determined on the basis of determined sensor data here by a computing device which inputs the status by means of a display device in the driver area of the vehicle.

If the quantity of water on the window has reached the threshold value, the driver, or even another user of the vehicle, can then instruct the control device to transmit a signal to the pump to transport hydrophobic fluid to the wiper.

A further non-limiting embodiment of any of the foregoing methods communicates the identified status to the control device, which automatically inputs a signal to a pump to transport hydrophobic fluid to the wiper when the quantity of water on the window has reached the threshold value.

A further non-limiting embodiment of any of the foregoing methods includes communicating hydrophobic fluid through a hollow profile of a wiper arm of the wiper to a wiper blade of the wiper.

In a further non-limiting embodiment of any of the foregoing methods, the hollow profile is divided into a first tube and a second tube. The first tube is configured to communicate hydrophobic fluid. The second tube is configured to communicate water.

A further non-limiting embodiment of any of the foregoing methods the first tube extends parallel to the second tube.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the detailed description. The drawings that accompany the detailed description can be briefly described as follows.

DETAILED DESCRIPTION

Figure 1:
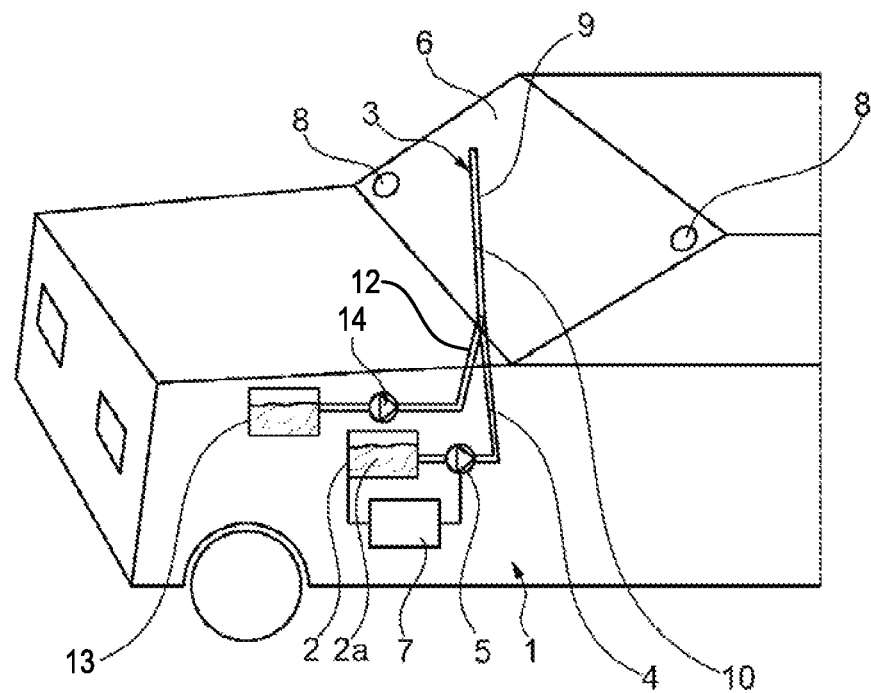
FIG. 1 is a schematic illustration of an exemplary embodiment of the system.

Referring to FIG. 1, a system 1, according to an exemplary non-limiting embodiment of this disclosure comprises a reservoir 2 for a hydrophobic fluid 2a, a wiper 3, a first line 4 for transporting the hydrophobic fluid from the reservoir 2 to the wiper 3, and a first pump 5, which is arranged in the first line 4.

The first line 4 extends over the entire length of the wiper 3. There can, however, also be more than one wiper, e.g., two. In this example, the wiper 3 is arranged in the region of a window, such as a windshield 6, of a motor vehicle.

The system 1 furthermore has a control device 7, which controls the first pump 5. The reservoir 2, the first pump 5, and the control device 7 are arranged in the region of the engine compartment of a motor vehicle. At least one sensor 8, which is designed to detect moisture, particularly rainwater, is furthermore arranged on the windshield 6.

Figure 2:
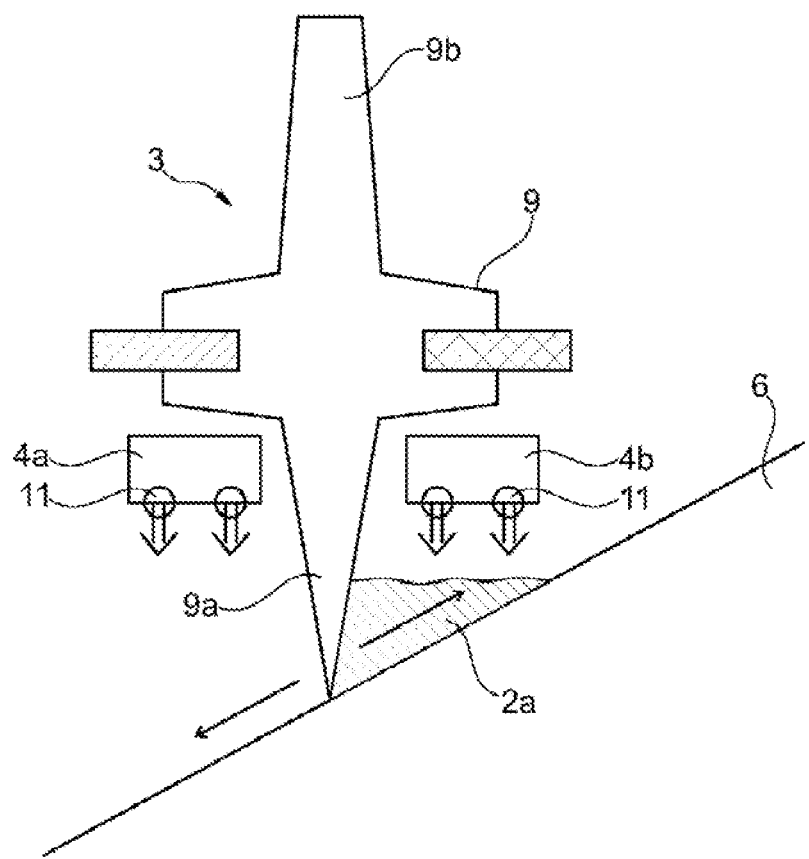
FIG. 2 is a schematic illustration of a detail of the embodiment according to FIG. 1.

Referring now to the detailed view of FIG. 2 with continuing reference to the system of FIG. 1, the wiper 3 has a wiper blade 9, which is mounted on a wiper arm 10. The wiper blade 9 has a lip 9a and a base portion 9b.

The first line 4 can be spilt into two sub-lines 4a and 4b in the region of the wiper 3 so that the sub-lines 4a, 4b extend on both sides of the lip 9a of the wiper blade. The first line 4 has a number of openings 11 in the region of the wiper 3. These openings 11 serve to apply hydrophobic fluid from the first line 4 to the windshield 6. The diameters of the openings 11 are variably adjustable. The openings in the first line 4 or in the sub-lines 4a, 4b can be arranged in multiple rows, e.g. two rows. In addition, a further line for spray water can also be arranged on the wiper 3.

As illustrated by the arrows in FIG. 2, a hydrophobic fluid 2a is applied from the sub-lines 4a, 4b to the windshield 6. The applied fluid is distributed over the surface of the windshield 6 by means of the movement of the wiper 3.

Figure 3A:
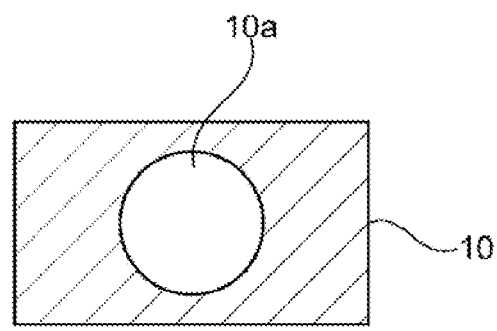
FIG. 3a is a schematic illustration of a cross-section through a wiper arm.

Referring now to FIG. 3a with reference to FIGS. 1 and 2, a cross-section of a wiper arm 10 shows an exemplary embodiment of the wiper arm 10 with a tubular hollow profile 10a. The first line 4 here either extends through the hollow profile 10a or is connected to the hollow profile 10a in such a way that the first line 4 leads into the hollow profile. Analogously to the first line 4, the hollow profile has openings (not shown) to transfer hydrophobic fluid 2a to the wiper blade 9.

Figure 3B:
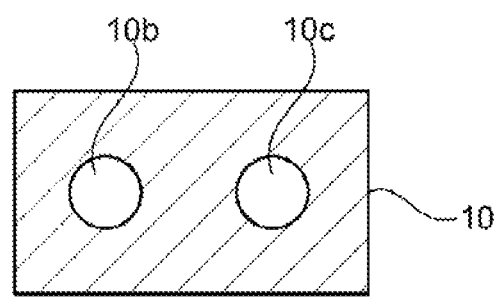
FIG. 3b is a schematic illustration of a cross-section through a wiper arm.

Referring to FIG. 3b with reference to FIGS. 1 and 2, a cross-section of a wiper arm 10 shows another exemplary embodiment of the wiper arm 10 in which the hollow profile is divided into a first tube 10b and a second tube 10c. The first tube 10b extends parallel to the second tube 10c in this example.

The first tube 10b here is provided for receiving, or for connection to, the first line 4, and the second tube 10c for receiving, or for connection to, a second line 12 which is designed to conduct water, which is to be sprayed onto the window, from a water reservoir 13. A second pump 14 is arranged in the second line 12.

Figure 4:
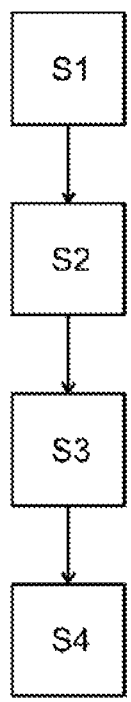
FIG. 4 is a flow diagram corresponding to a method of the system.

Referring now to FIG. 4 with reference to FIGS. 1 and 2, an exemplary method of applying a water-repellent coating begins at a first step S1. The water-repellent coating can also be described as a water-repellent film on account of its nature.

In the first step S1, a status of the water-repellent properties of the windshield 6 is determined. The status is identified with reference to a defined threshold value which relates to the quantity of water on the windshield. To this end, the water-repellent behavior of the outer-facing surface of the windshield 6 is measured by the sensor 8. The water-repellent behavior can be tested with water from rainfall and/or snowfall and/or road wetness, for example, or from spray water applied to the windshield 6 from the water reservoir 13.

Generally, the threshold value relates to a quantity of water that clings to the window without rolling off. Exceeding the threshold value here means that water remains on the window in a quantity which impairs visibility through the window and the water-repellent properties of the window are therefore deemed inadequate. Below the threshold value, the water-repellent properties are deemed adequate. The quantity of water is measured by sensors arranged on the window. To this end, a certain quantity of water is sprayed from the water reservoir onto the window by way of the second line to determine whether the water-repellent coating is adequate for reducing the quantity of water on the windshield to below the threshold value.

If the threshold value is reached or exceeded, the method moves to a second step S2 where a signal is transmitted from the control device 7 to the first pump 5 to transport hydrophobic fluid 2a from the reservoir 2 to the wiper 3.

Next, in a third step S3, hydrophobic fluid 2a is pumped from the reservoir 2 to the wiper 3. The hydrophobic fluid 2a passes through the openings 10 here from the first line 4 or the sub-lines 4a, 4b to the windshield 6.

Afterwards, in a fourth step S4, the hydrophobic fluid 2a is distributed on the windshield 6 by means of a typical back and forth movement of the wiper 3. The movement of the wiper 3 is continued until the hydrophobic fluid 2a has been distributed on the windshield 6 and the visibility through the windshield 6 is clear.

The steps S1 to S4 can be repeated until the quantity of water on the windshield 6 falls below the threshold value again. To this end, to detect whether the water-repellent coating is adequate for reducing the quantity of water on the windshield 6 to below the threshold value, a certain quantity of water is sprayed onto the window from the reservoir 13 by way of the second line 12.

The method of FIG. 4 can be carried out while the vehicle is not in a moving state, i.e., stationary. The method can be repeated at any time if the quantity of water on the windshield 6 exceeds the threshold value again.

In an exemplary embodiment of the method, the openings 11 for applying the hydrophobic fluid 2a are adjusted to their largest possible size so that a quantity of hydrophobic fluid 2a with which a water-repellent film can be formed on the windshield 6 is applied to the windshield 6 in as short a time as possible. The water-repellent film formed here can furthermore be formed with as great a thickness as possible in as short a time as possible so that the water-repellent effect lasts for longer.

In a further embodiment of the method, the openings 11 for applying the hydrophobic fluid 2a are adjusted to their smallest possible size to restrict consumption when the reserves of hydrophobic fluid 2a in the reservoir 2 are relatively low.

For purposes of this disclosure, the term "water-repellent" is used as an adjective in connection with surfaces; and the term "hydrophobic" in connection with substances which impart the water-repellent effect. The term "vehicle" refers, in the wider sense, to all possible vehicles including aircraft and rail vehicles; however, in the narrower sense, particularly to motor vehicles for road travel. The term "window" refers, in the wider sense, to all windows of a vehicle; in the narrower sense, predominantly to the windows of a vehicle which are equipped with a wiper and therefore particularly to a windshield of a motor vehicle, but also, for example, to a rear window of a motor vehicle.

Features of some of the examples of this disclosure include a hydrophobic material that can be applied to the window in a controlled manner when required, that is to say when the water-repellent effect of the window does not correspond to a set value, which is predefined. By carrying out the application by way of the wiper, it is not necessary to laboriously apply a water-repellent coating to the window manually. Furthermore, it is advantageously possible to conveniently refill hydrophobic fluid by way of the reservoir.

As a hydrophobic fluid for forming a water-repellent film on the window, it is possible to use any fluid which is suitable for application to a glass window and forms a film thereon. Commercially available hydrophobic fluids which can also be applied by hand to a glass window, particularly to a window of a motor vehicle, are suitable. An ethanol-based fluid can be used. This can advantageously also be used at temperatures below zero without the fluid freezing and needing to be warmed up before being applied.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A system for applying a water-repellent coating to the outside of a window of a vehicle, comprising:
a first reservoir that holds a hydrophobic first fluid;
a second reservoir that holds a second fluid that is sprayed onto the window, the second fluid different than the hydrophobic first fluid;
a wiper with a wiper blade;
a control device; and
at least one sensor arranged in the region of the window and operably connected to the control device, the at least one sensor configured to measure a water-repellent behavior of an outer-facing surface of the window;
a first line that leads from the first reservoir to the wiper, wherein the first line extends at least over part of a length of the wiper and has, in a region of the wiper blade, at least one opening by way of which the hydrophobic first fluid can be applied to the window, wherein the control device is configured to adjust a flow of the hydrophobic first fluid to the wiper in response to feedback from the at least one sensor.

2. The system of claim 1, wherein a wiper arm of the wiper has a hollow profile configured to receive the first line and configured to communicate the hydrophobic first fluid to the wiper blade.

3. The system of claim 2, wherein the hollow profile is divided into a first tube and a second tube, the first tube configured to receive the first line, the second tube configured to receive a second line leading from the second reservoir to the wiper, the second line configured to communicate the second fluid to the wiper blade.

4. The system of claim 3, wherein the first tube extends parallel to the second tube.

5. The system of claim 3, further comprising at least one first pump that pumps the hydrophobic first fluid through the first line from the first reservoir to the wiper, and at least one second pump that pumps the second fluid through the second line from the second reservoir to the wiper.

6. The system of claim 1, wherein the wiper blade comprises a nanocoating.

7. The system of claim 1, wherein the at least one sensor is a rain sensor.

8. A motor vehicle comprising the system of claim 1.

9. The system of claim 1, wherein the second fluid is water.

10. The system of claim 1, wherein the wiper blade has a lip and a base portion, the lip configured to direct contact the window, wherein the first line is split into two first sub-lines in the region of the wiper, wherein the sub-lines extend along the wiper blade on both sides of the lip.

11. The system of claim 10, wherein the first line from the first reservoir connects to a hollow profile in the wiper arm.

12. The system of claim 10, wherein the at least one opening includes a plurality of openings, the plurality of openings arranged in multiple rows.

13. The system of claim 10, further comprising a second line that leads from the second reservoir to the wiper.

14. A water-repellent coating system, comprising:
a first reservoir holding a first fluid;
a second reservoir holding a different, second fluid, wherein the first fluid is a hydrophobic fluid;
a wiper with a wiper blade and a wiper arm;
a line from the first reservoir that connects to a hollow profile of the wiper arm;
a control device that selectively commands a first pump to communicate the first fluid from the first reservoir to a window of a vehicle through at least one opening in a region of the wiper blade, and that selectively commands a second pump to communicate the second fluid from the second reservoir as spray onto the window, wherein the second pump communicates the second fluid from the second reservoir through at least one opening in the region of the wiper blade; and
at least one sensor configured to measure a water-repellant behavior of an outer-facing surface of the window, the control device configured to adjust a flow of the first fluid to the wiper in response to feedback from the at least one sensor.

15. The water-repellent coating system of claim 14, wherein the wiper blade has a lip and a base portion, the lip configured to directly contact the window, wherein the first line is split into two first sub-lines in the region of the wiper, wherein the sub-lines extend along the wiper blade on both sides of the lip.

16. The water-repellent coating system of claim 14, wherein the second fluid is water.

17. The water-repellent coating system of claim 14, wherein the at least one opening includes a plurality of openings, the plurality of openings arranged in multiple rows.

18. The water-repellent coating system of claim 14, wherein the line is a first line and the hollow profile is a first hollow profile, and further comprising a second line from the second reservoir that connects to a second hollow profile in the wiper arm.

\* \* \* \* \*